United States Patent
Hoffert et al.

(10) Patent No.: US 11,470,381 B2
(45) Date of Patent: Oct. 11, 2022

(54) SYSTEMS AND METHODS FOR REDUCING DIGITAL VIDEO LATENCY

(71) Applicant: Xandr Inc., New York, NY (US)

(72) Inventors: Eric M. Hoffert, New York, NY (US); Jeffrey Weiss, Chatsworth, CA (US); Vikki Pitts, Northridge, CA (US); Alexander Krassel, Encino, CA (US); Yevgeniy Nisman, New York, NY (US); Radhika Shivapurkar, Woodland Hills, CA (US)

(73) Assignee: Xandr Inc., New York, NY (US)

( * ) Notice: Subject to any disclaimer, the term of this patent is extended or adjusted under 35 U.S.C. 154(b) by 0 days.

(21) Appl. No.: 17/313,222

(22) Filed: May 6, 2021

(65) Prior Publication Data
US 2021/0258634 A1      Aug. 19, 2021

Related U.S. Application Data

(63) Continuation of application No. 15/943,375, filed on Apr. 2, 2018, now Pat. No. 11,032,605, which is a (Continued)

(51) Int. Cl.
*H04N 21/438* (2011.01)
*H04N 21/6543* (2011.01)
(Continued)

(52) U.S. Cl.
CPC ... *H04N 21/4384* (2013.01); *H04N 21/23424* (2013.01); *H04N 21/4331* (2013.01);
(Continued)

(58) Field of Classification Search
CPC ........... H04N 21/4384; H04N 21/6543; H04N 21/4331; H04N 21/23424; H04N 21/4782; H04N 21/4667; H04N 21/47202
See application file for complete search history.

(56) References Cited

U.S. PATENT DOCUMENTS

| 6,029,195 A | 2/2000 | Herz et al. |
| 2002/0095332 A1 | 7/2002 | Doherty et al. |
| (Continued) | | |

OTHER PUBLICATIONS http://www.cnn.com/videos/world/2015/12/05/climate-change-conference-cop21-brazil-rio-de-janeiro-gmbh.cnn. Video Functionality, Jan. 25, 2017, pp. 1-2.
(Continued)

*Primary Examiner* — Nathan J Flynn
*Assistant Examiner* — Christine A Kurien
(74) *Attorney, Agent, or Firm* — Calfee, Halter & Griswold LLP

(57) ABSTRACT

Examples of the systems and methods described herein relate to reducing latency issues associated with playing online digital video on client devices. An example method includes: determining that a client device of a user is displaying a web page; determining a likelihood that the user will select content on the web page, the content being associated with a digital video; determining that the likelihood exceeds a threshold and, based thereon: identifying the digital video associated with the content; obtaining a copy of a video file including the digital video and an initial portion that precedes the digital video; initiating a video player for displaying the digital video; determining a start location in the video file where the initial portion ends and the digital video begins; and configuring the video player to begin playing the video file from the start location when the user selects the content.

20 Claims, 8 Drawing Sheets

Related U.S. Application Data continuation-in-part of application No. 15/341,888, filed on Nov. 2, 2016, now Pat. No. 10,728,612.

(60) Provisional application No. 62/479,456, filed on Mar. 31, 2017, provisional application No. 62/298,602, filed on Feb. 23, 2016, provisional application No. 62/298,570, filed on Feb. 23, 2016, provisional application No. 62/249,861, filed on Nov. 2, 2015.

(51) Int. Cl.
  H04N 21/433 (2011.01)
  H04N 21/472 (2011.01)
  H04N 21/466 (2011.01)
  H04N 21/4782 (2011.01)
  H04N 21/234 (2011.01)

(52) U.S. Cl.
  CPC ..... *H04N 21/4667* (2013.01); *H04N 21/4782* (2013.01); *H04N 21/47202* (2013.01); *H04N 21/6543* (2013.01)

(56) References Cited

U.S. PATENT DOCUMENTS

| | | |
|---|---|---|
| 2005/0084136 A1 | 4/2005 | Xie et al. |
| 2008/0259906 A1 | 10/2008 | Shkedi |
| 2012/0155834 A1 | 6/2012 | Beacham et al. |
| 2013/0298147 A1 | 11/2013 | Klein et al. |
| 2014/0115114 A1 | 4/2014 | Garmark et al. |
| 2015/0130705 A1 | 5/2015 | Im |
| 2016/0180762 A1 | 6/2016 | Bathiche et al. |
| 2018/0143842 A1 | 5/2018 | Weiss et al. |
| 2020/0322674 A1 | 10/2020 | Lidow et al. |

OTHER PUBLICATIONS

"AppNexus Announces Launch of Price Check, Header Bidding for Mobile Apps.", http://www.appnexus.com/company/pressroom/appnexus-announces-launch-of-pricecheck-header-bidding-for-mobile-apps, Jan. 26, 2016; pp. 1-3.

Eifler, A., "Realizing the Potential of Video (Pt. 2).", AppNexus Summit Europe; http://www.youtube.com/watch?v=5zf11G3S6Y0; 2015; pp. 1-2.

Freier, A., "AppNexus Lauches Header Bidding for Mobile Apps.", Business of Apps. at http://www.businessofapps.com/appnexus-launches-header-bidding-for-mobile-apps/; Jan. 26, 2016; pp. 1-4.

Hoffert, E., "It's Time for a Revolution in Video Monetization Latency.", Medium. at http://medium.com/@erichoffert/it-s-time-for-a-revolution-in-video-monetization-latency-77b723f14b97. Last Accessed Jul. 24, 2018; pp. 1-16.

Hoffert, E., "Realizing the Potential of Video (Pt.1).", AppNexus Summit Europe 2015 at https://www.youtube.com/watch?v=sl5OFOJTK0c. Last accessed Jul. 24, 2018; pp. 1-2.

Rich, C., "A Comprehensive List of Online Video Ad Types and Formats, Pros and Cons.", Tubular Insights at http://tubularinsights.com/online-video-ad-types-formats/. Last accessed Sep. 13, 2016; pp. 1-16.

Schiff, A., "AppNexus Tosses Its Mobile Header Bidding Solution in the Ring.", Ad Exchanger at https://adexchanger.com/mobile/appnexus-tosses-its-mobile-header-bidding-solution-into-the-ring/. Last accessed Jul. 24, 2018; pp. 1-3.

SYSTEMS AND METHODS FOR REDUCING DIGITAL VIDEO LATENCY

CROSS REFERENCE TO RELATED APPLICATIONS

This application is a continuation of U.S. patent application Ser. No. 15/943,375 filed on Apr. 2, 2018. U.S. patent application Ser. No. 15/943,375 filed on Apr. 2, 2018, claims the benefit of priority to U.S. Provisional Application No. 62/479,456 filed on Mar. 31, 2017, and is a Continuation-in-part of Ser. No. 15/341,888 (now U.S. Pat. No. 10,728,612), filed Nov. 2, 2016, which claims the benefit of priority to U.S. Provisional Application No. 62/298,570 filed on Feb. 23, 2016 and U.S. Provisional Application No. 62/298,602 filed on Feb. 23, 2016 and U.S. Provisional Application No. 62/249,861 filed on Nov. 2, 2015. The contents of each of the foregoing are hereby incorporated by reference into this application as if set forth herein in full.

BACKGROUND

This specification relates to online digital video and, in particular, to systems and methods for reducing latency issues associated with providing online digital video.

Viewers of online digital video often experience significant latency issues when digital videos are selected for viewing. After an online digital video is selected, for example, it can be several seconds (e.g., 5, 10, or 20 seconds) or more before the video begins playing on the user's computer or other client device. Some sources for the latency issues include poor Internet connections, inefficient identification or retrieval of video content, and/or improper functioning of digital video players. The end result is a system that requires users to wait a considerable length of time before online digital videos are initiated and ready for playing. Such delays can frustrate users and result in significant reductions in online digital video consumption.

There is a need for systems and methods that reduce latency issues associated with online digital video content.

The foregoing discussion, including the description of motivations for some embodiments of the invention, is intended to assist the reader in understanding the present disclosure, is not admitted to be prior art, and does not in any way limit the scope of any of the claims.

SUMMARY

Examples of the systems and methods described herein result in more efficient initiation and presentation of online digital video content. In some embodiments, the systems and methods can be used to predict a likelihood that a user will select online content associated with a digital video. When the likelihood exceeds a threshold, the systems and methods can take steps to identify and prepare the digital video content for viewing on the user's client device, before the user selects the online content. By taking such steps, the digital video can be ready for immediate display, once the content is selected. The end result is a more efficient and enjoyable digital video experience for the user.

According to an aspect of the present disclosure, a computer-implemented method of reducing digital video latency, is provided. The method includes determining that a client device of a user is displaying a web page; determining a likelihood that the user will select content on the web page, the content being associated with a digital video; and determining that the likelihood exceeds a threshold and, based thereon, performing at least one of the following steps before the user selects the content: initiating a mediation process to identify the digital video associated with the content; unwrapping a video tag associated with the digital video; storing at least a portion of the digital video on the client device; stitching the digital video together with a second digital video; and initializing a video player for displaying the digital video on the client device.

In some embodiments, determining the likelihood includes predicting a time at which the content will be accessible to the user. In some embodiments, the likelihood is determined based on a viewing history of the user, a viewing history of other users, a duration of the user's Internet session, and/or an Internet browser history. In some embodiments, the content is selectable by clicking the link, tapping the link, and/or viewing the content.

In some embodiments, the method includes initiating the mediation process to identify the digital video before the user selects the content. In some embodiments, the method includes unwrapping the video tag associated with the digital video before the user selects the content. In some embodiments, the method includes storing at least the portion of the digital video on the client device before the user selects the content. In some embodiments, the method includes stitching the digital video together with the second digital video before the user selects the content. In some embodiments, the method includes initializing the video player for displaying the digital video on the client device before the user selects the content.

According to another aspect of the present disclosure, a system is provided. The system includes a client device of a user. The client device includes data processing apparatus programmed to perform operations for reducing digital video latency. The operations include determining that the client device of the user is displaying a web page; determining a likelihood that the user will select content on the web page, the content being associated with a digital video; and determining that the likelihood exceeds a threshold and, based thereon, performing at least one of the following steps before the user selects the content: initiating a mediation process to identify the digital video associated with the content; unwrapping a video tag associated with the digital video; storing at least a portion of the digital video on the client device; stitching the digital video together with a second digital video; and initializing a video player for displaying the digital video on the client device.

In some embodiments, determining the likelihood includes predicting a time at which the content will be accessible to the user. In some embodiments, the likelihood is determined based on a viewing history of the user, a viewing history of other users, a duration of the user's Internet session, and/or an Internet browser history. In some embodiments, the content is selectable by clicking the link, tapping the link, and/or viewing the content.

In some embodiments, the operations include initiating the mediation process to identify the digital video before the user selects the content. In some embodiments, the operations include unwrapping the video tag associated with the digital video before the user selects the content. In some embodiments, the operations include storing at least the portion of the digital video on the client device before the user selects the content. In some embodiments, the operations include stitching the digital video together with the second digital video before the user selects the content. In some embodiments, the operations include initializing the video player for displaying the digital video on the client device before the user selects the content.

According to another aspect of the present disclosure, a non-transitory computer storage medium having instructions stored thereon is provided. When executed by data processing apparatus, the instructions cause the data processing apparatus to perform operations for reducing digital video latency. The operations include determining that a client device of a user is displaying a web page; determining a likelihood that the user will select content on the web page, the content being associated with a digital video; and determining that the likelihood exceeds a threshold and, based thereon, performing at least one of the following steps before the user selects the content: initiating a mediation process to identify the digital video associated with the content; unwrapping a video tag associated with the digital video; storing at least a portion of the digital video on the client device; stitching the digital video together with a second digital video; and initializing a video player for displaying the digital video on the client device.

In some embodiments, determining the likelihood includes predicting a time at which the content will be accessible to the user. In some embodiments, the likelihood is determined based on a viewing history of the user, a viewing history of other users, a duration of the user's Internet session, and/or an Internet browser history. In some embodiments, the content is selectable by clicking the link, tapping the link, and/or viewing the content.

Elements of embodiments or examples described with respect to a given aspect of the invention can be used in various embodiments or examples of another aspect of the invention. For example, it is contemplated that features of dependent claims depending from one independent claim can be used in apparatus, systems, and/or methods of any of the other independent claims.

The details of one or more embodiments of the subject matter described in this specification are set forth in the accompanying drawings and the description below. Other features, aspects, and advantages of the subject matter will become apparent from the description, the drawings, and the claims.

The foregoing Summary, including the description of advantages of some embodiments, is intended to assist the reader in understanding the present disclosure, and does not in any way limit the scope of any of the claims.

DETAILED DESCRIPTION

It is contemplated that apparatus, systems, and methods embodying the subject matter described herein encompass variations and adaptations developed using information from the examples described herein. Adaptation and/or modification of the apparatus, systems, and methods described herein may be performed by those of ordinary skill in the relevant art.

Throughout the description, where apparatus and systems are described as having, including, or comprising specific components, or where processes and methods are described as having, including, or comprising specific steps, it is contemplated that, additionally, there are apparatus and systems of the present invention that consist essentially of, or consist of, the recited components, and that there are processes and methods according to the present invention that consist essentially of, or consist of, the recited processing steps.

Figure 1:
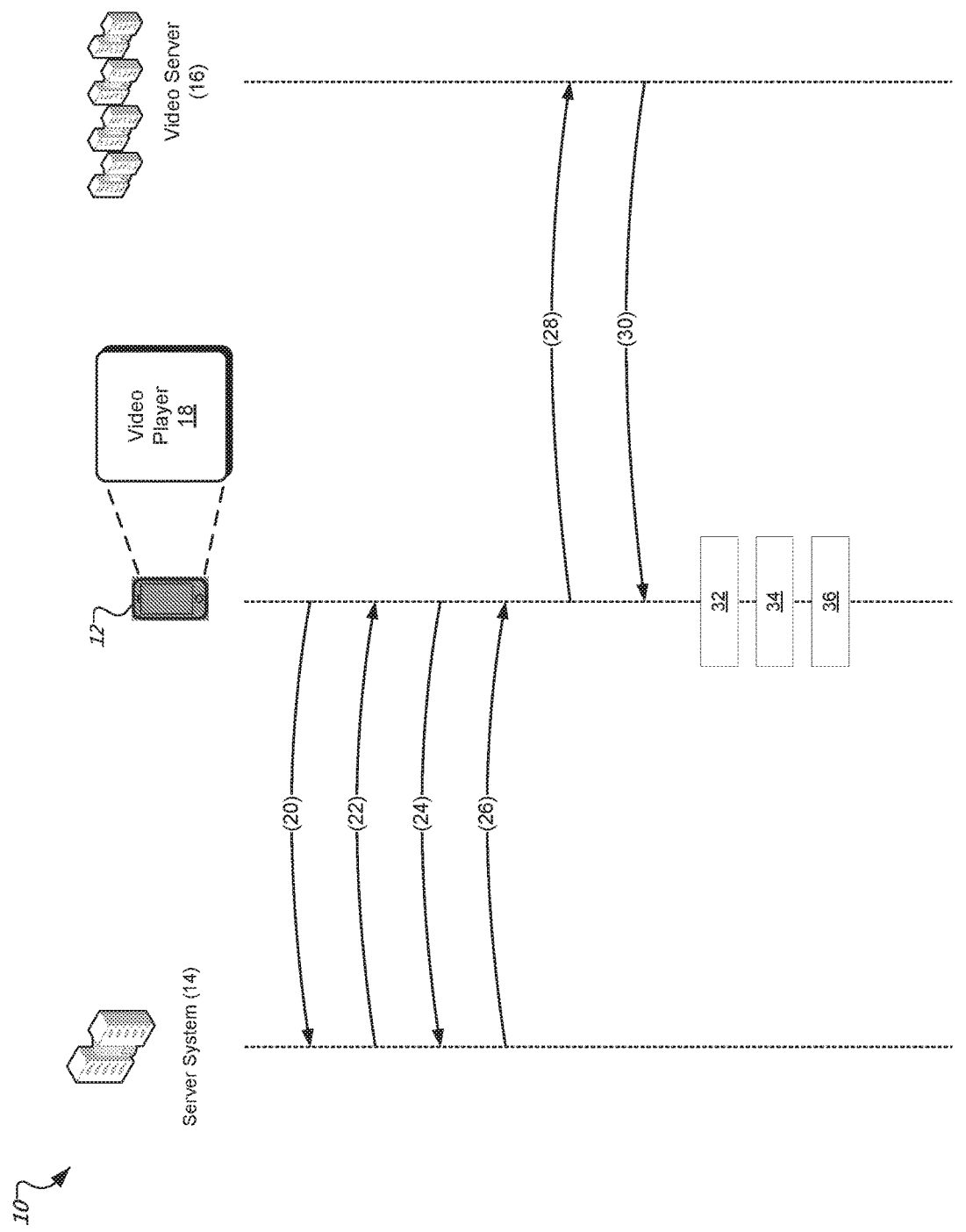
FIG. 1 is a schematic data flow diagram of an example method for viewing online digital video.

FIG. 1 is a data flow diagram of an example method 10 for providing (e.g., obtaining and displaying) a video on a client device. The method 10 is performed by a client device 12, which communicates with a server system 14 and a video server 16. The client device 12 includes or uses a video player 18 to display online video content on the client device 12. The video player 18 can be stored and/or executed on the client device 12. Alternatively or additionally, the video player 18 can be stored and/or executed external to the client device 12, such as on the server system 14 and/or on the video server 16.

To display a video on the client device 12, the client device 12 can send (step 20) a request for content to the server system 14. The request can be sent in response to certain activity by a user of the client device 12. For example, the user can open a web browser or application on the client device 12 and request online content. The request can be or include, for example, an address for a web page that the user is attempting to access. After receiving the request, the server system 14, can send (step 22) web page or other online content (e.g., in the form of an HTML file) to the client device 12. The user can then view the content (e.g., web page) on the client device 12 and may attempt to select or otherwise access a digital video accessible from the web page. When the user selects content (e.g., a link or window) associated with the digital video, the client device 12 can send (step 24) to the server system 14 an indication that the user has selected the content. In response, the server system 14 can send (step 26) a video tag back to the client device 12. The video tag may be or include, for example, data related to how the client device 12 can access the digital video. In certain examples, the video tag includes a network address of a video file containing the digital video (e.g., in a link to the video file) and/or includes data related to the digital video, such as information about a length or a format for the digital video. After receiving and processing the video tag, the client device 12 sends (step 28) a request to the video server 16 to access the video file and the digital video. The video server 16 can send (step 30) the video file to the client device 12.

After or before the video file is received by the client device 12, the client device 12 can load (step 32) the video player 18. The video player 18 processes (step 34) the video file, including any executable code or initial portions of the video file that are designated for processing before the digital video is displayed. The video player 18 is used to display (step 36) the digital video on the client device 12.

As discussed above, the process illustrated in FIG. 1 can result in significant latency between the time when a user selects a digital video for viewing and the time when a video player on the user's device begins playing the video. The inventors have recognized and appreciated that, in many cases, such latency can be reduced by eliminating one or more of the steps (20-36) illustrated in FIG. 1 and/or by initiating such steps sooner (e.g., before the user actually selects the digital video).

Figure 2:
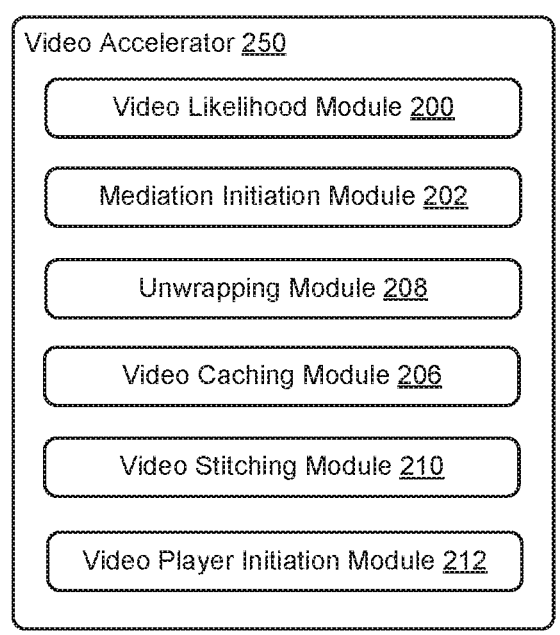
FIG. 2 is a schematic diagram of an example video accelerator that includes multiple modules for reducing latency associated with online digital video, in accordance with some embodiments.

FIG. 2 is an example video accelerator 250 that includes or utilizes various modules for reducing or eliminating latency issues associated with online digital video. The modules can be implemented in software, hardware, or combinations thereof, and can use processors associated with one or more servers and/or client devices. The video accelerator 250 can reside on or be processed with a server system and/or a client device (e.g., the client device 12), as described herein.

For ease of understanding, the operations of the video accelerator 250 are generally described below in the context of a scenario in which a user who is viewing a web page on a client device selects digital content associated with an online digital video, which is subsequently displayed by a video player on the client device. However, one of ordinary skill in the art will appreciate that the techniques described herein are also applicable to other scenarios, including, without limitation, scenarios in which digital content associated with an online digital video is automatically selected on the user's behalf (e.g., by the user's device or by other devices in communication with the user's device), scenarios in which the user is viewing digital content other than a web page (e.g., digital content associated with a mobile app), etc.

In the depicted example, the video accelerator 250 includes or utilizes a video likelihood module 200, a mediation initiation module 202, a video caching module 206, an unwrapping module 208, a video stitching module 210, and a video player initiation module 212. In general, the video likelihood module 200 may be used to determine a likelihood that digital content associated with an online digital video will be selected (e.g., by the user). The likelihood can then be compared to a threshold value (e.g., 10%, 25%, 50%, or 75%), which can be determined and/or specified by providers (e.g., owners, operators, and/or publishers) of the digital content (e.g., web page) being viewed by the user, for example. When the likelihood exceeds the threshold value, the video accelerator 250 can coordinate the performance of various tasks for reducing or eliminating latency associated with displaying a digital video associated with the selected digital content. In this way, when the digital content associated with the online digital video is selected, there may be little or no delay before the digital video is displayed for the user (e.g., on the client device 12).

Figure 3:
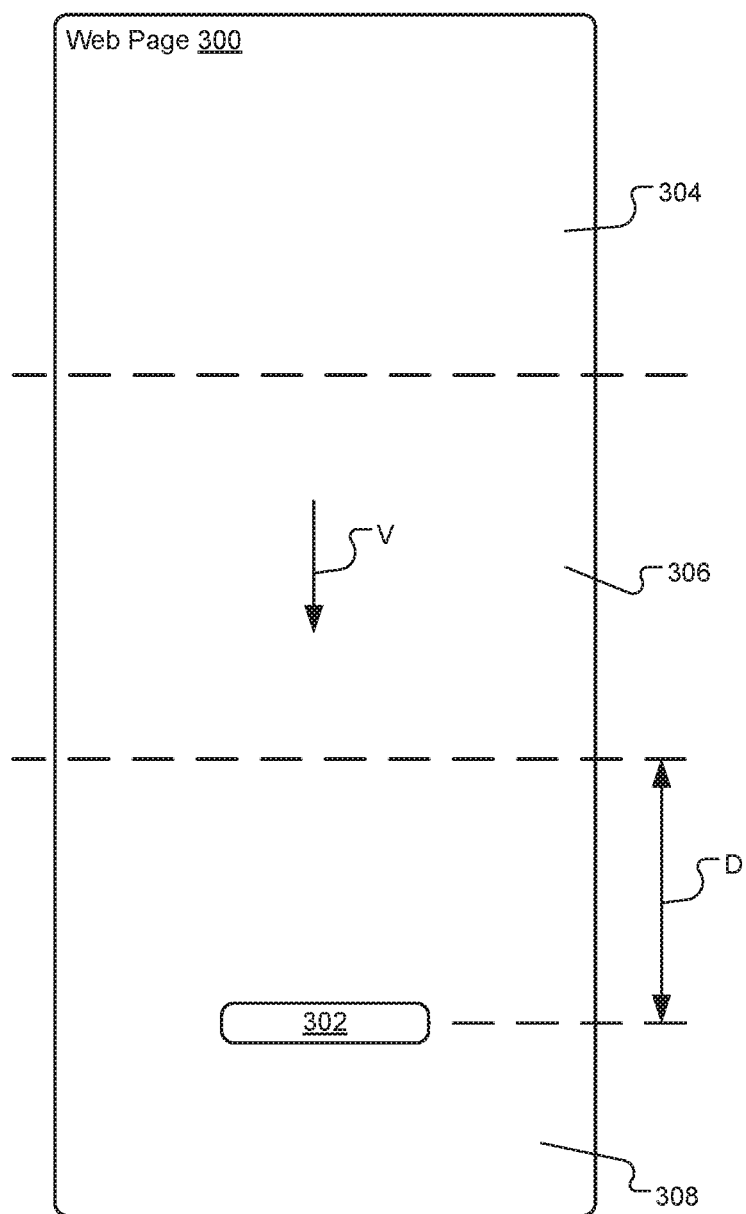
FIG. 3 is a schematic diagram of an example web page having content associated with a digital video, in accordance with some embodiments.

FIG. 3 is a schematic diagram of an example web page 300 that includes digital content 302 associated with an online digital video. The content 302 can be or include, for example, a link, an image, a video player, a play button on a video player, a portion of the web page reserved for or associated with a video player, another user interface component, and/or other data that, when selected, initiates a process for displaying a digital video on a client device. A user can select the content 302 by, for example, tapping a touch screen or clicking a mouse associated with the client device. In some embodiments, the content 302 can be selected automatically (e.g., simply by being partially or fully displayed on the client device). In that case, for example, an online digital video or other information may be automatically presented when the content 302 is displayed, without further interaction from the user.

In the depicted example, the web page 300 includes a top portion 304 that has already been viewed by the user on the client device, a middle portion 306 that is presently being viewed by the user, and a bottom portion 308 that has not yet been viewed by the user and that includes the content 302. To determine a likelihood that the content 302 will be selected, the video likelihood module 200 can estimate a time it will take before the user reaches the content 302. The time can be determined, for example, based on a distance D between the middle portion 306 and the content 302 and/or based on a velocity V at which the user is scrolling through the web page. The distance D may be measured in inches, cm, pixels, or a percentage of web page length, for example. The velocity V may be measured in inches/sec, cm/sec, pixels/sec, or a percentage of web page length per second, for example. In certain implementations, the time until the user reaches the content is 302 is determined from time=D/V. In general, the predicted time increases as the distance D is increased and/or as the velocity V is decreased. In various instances, when the predicted time is large, it is less likely that the user will select the content 302, because the user may lose patience and/or become distracted and may never reach the content 302. In one example, a mouse pointer velocity and/or a distance between a mouse pointer and the content 302 can be used to predict a likelihood that the user will select the content 302.

Alternatively or additionally, the video likelihood module 200 can determine the likelihood that the user will select the content 302 based on other factors, including: a viewing history of the user, a viewing history of other users, a duration of the user's Internet session, and/or an Internet browser history. For example, if the user has historically accessed information (e.g., related to sports, politics, current events, or breaking news) that is similar to information associated with the content 302, the determined likelihood that the user will select the content 302 can be higher. Likewise, if other users have shown a tendency to select the content 302, the determined likelihood that the current user will also select the content 302 can be higher. Further, if the user's Internet session has just begun, the determined likelihood that the user will select the content 302 can be higher, given that the user is more likely to be focused on the Internet session and/or seeking information similar to the content 302. Further, the user's Internet browser history may indicate that the user recently performed a search for information associated with the content 302 and/or selected a link that directed the user to the content 302. In such instances, the determined likelihood that the user will select the content 302 can be high, given that the user is probably looking for the content 302. Viewing histories and Internet browser histories can be stored locally on the client device and/or in one or more databases associated with a server system, as described herein.

In some examples, the video likelihood module 200 uses machine learning to predict the likelihood that the user will select the content 302. The training data for a machine learning classifier or other predictive model can be or include, for example, information related to the distance D, the velocity V, the predicted time until the user reaches the content, the viewing history of the user and/or other users, the duration of the user's Internet session, the user's browser history, and/or whether or not the user selected the associated content 302. The video likelihood module 200 or other components of the systems and methods described herein can monitor and collect such information for multiple users and train one or more predictive models. The predictive models may be or include, for example, one or more linear classifiers (e.g., Fisher's linear discriminant, logistic regression, Naive Bayes classifier, and/or perceptron), support vector machines (e.g., least squares support vector machines), quadratic classifiers, kernel estimation models (e.g., k-nearest neighbor), boosting (meta-algorithm) models, decision trees (e.g., random forests), neural networks, and/or learning vector quantization models. Other predictive models can be used.

Once the video likelihood module 200 determines the likelihood that the user will select the content 302, the video likelihood module 200 compares the likelihood with the threshold value. If the likelihood exceeds the threshold value, the video likelihood module 200 can instruct the video accelerator 250 and/or other system components (e.g., modules 202, 206, 208, 210, and/or 212) to prepare for possible selection of the content 302 and presentation of the digital video. The video accelerator 250 and/or the other system components can then take action to reduce latency associated with the digital video, as described herein.

In some examples, the video likelihood module 200 can determine that the likelihood of the content 302 being selected is sufficiently high based on one or more heuristics, without actually calculating the likelihood of the content 302 being selected or comparing that likelihood to a threshold value. For example, the video likelihood module 200 can determine that the likelihood of particular content C being selected is sufficiently high if (1) the client device loads a web page that includes the content C, (2) the user selects a link to a web page that includes the content C, (3) the user launches a mobile app that includes the content C, (4) the user accesses a portion of a mobile app (e.g., a particular portion of a user interface for the mobile app) that includes the content C, and/or (5) the user accesses one or more other items of content related to the content C, etc. If the likelihood of the content C being selected is sufficiently high, the video likelihood module 200 can instruct the video accelerator 250 and/or other system components (e.g., modules 202, 206, 208, 210, and/or 212) to prepare for possible selection of the content 302 and presentation of the digital video. The video accelerator 250 and/or the other system components can then take action to reduce latency associated with the digital video, as described herein.

Referring again to FIG. 2, in certain instances, the mediation initiation module 202 is instructed to initiate a mediation process before the user selects the content 302. In general, the mediation process is used to identify a digital video to be played on the user's client device, once the associated digital content 302 is selected. In some embodiments, the mediation process involves communicating with a remote server (e.g., the web server or other server that provided the web page and the associated content 302). For example, the user's client device may send a message to the remote server, requesting that the remote server identify the online video to be displayed when the associated content 302 is selected, and the remote server may respond with a message identifying the video to be displayed.

In some embodiments, the mediation process involves not only identifying the video to be displayed, but also determining which video to display, because multiple videos may be associated with the content 302. For example, a remote server (e.g., the web server or other server that provided the web page and the associated content 302) may determine the video to be displayed based on attributes of the user, which may be represented by data included in the client device's message to the remote server. Alternatively or in addition, the mediation process can include, for example, initiating an online auction with online bidders, in which each bidder offers to pay a monetary amount in exchange for playing the bidder's digital video on the client device. When one of the offers is accepted (e.g., by an owner or publisher of the web page 300, or by an auction operator), the digital video associated with the offer can be identified as the digital video that will be played on the client device, once the content 302 is selected. Such auctions may be performed, for example, when the content 302 is or includes a video advertisement player, and in such cases the identified digital video can be a specific video advertisement. Alternatively or additionally, the digital video to be displayed can be determined based on a look-up chart or other data linking the content 302 and the digital video.

In some examples, the mediation process may result in the user's client device obtaining a "video tag" or "video serving tag" (VST). The video tag can include data identifying a video file (which may contain a digital video, e.g., the digital video to be played on the client device, once the user selects the content 402), a network address of the video file, and/or other data associated with the video (e.g., a length and/or a format for the video). As described herein, the video file can include executable code or other data designated for processing before the digital video is displayed. In some embodiments, execution of such code or processing of such data may result in the initiation of another mediation process, which may result in the user's client device obtaining another video tag. This process (sometimes referred to herein as "unwrapping") of obtaining a video tag, obtaining the video file identified by the tag, and executing code or processing data in the video file may be repeated one or more times, until the client device actually obtains a video file containing the video to be displayed. The unwrapping process can be time-consuming and can contribute to latency issues.

To reduce or avoid such latency issues, the unwrapping module 208 is configured to initiate the unwrapping process before the user selects the content 302. The unwrapping module 208 is preferably able to complete the unwrapping process before the user selects the content 302, such that the digital video is identified, obtained by the client device (e.g., received, downloaded from a server, etc.), and ready for playing before the content 302 is selected. In some instances, the unwrapping module 208 stores data extracted from the video tags obtained from the unwrapping process. That way, when the same video tag is encountered again in the future, the unwrapping module 208 can access the stored information, rather than performing the unwrapping process again.

Alternatively or additionally, the video caching module 206 can be instructed to store at least a portion of the identified digital video on the client device of the user. With the digital video or portions thereof stored on the client device, the digital video can be accessed or played more quickly, once the content 302 is selected. In various examples, the video caching module 206 receives the digital video to be cached from one or more other modules, such as the mediation initiation module 202 and/or the unwrapping module 208.

In various instances, once the digital video to be played has been identified, the video stitching module 210 can combine or stitch the digital video together with one or more other videos. For example, when the user selects the content 302 in an effort to watch a particular video, the user may do so with the understanding that one or more video advertisements will be played before playing the particular video, at intermittent times after playing portions of the particular video, or after playing the particular video in its entirety. When two or more videos are played, latency issues can be reduced by stitching the videos together into a single video. This stitching technique allows the video player on the client device to proceed seamlessly from one digital video to the next, without transitioning from loading and playing one video to loading and playing the next video. In some examples, the video stitching module 210 can obtain the digital videos or data identifying the digital videos from other modules (e.g., the mediation initiation module 202, the unwrapping module 208, and/or the video caching module 206). The video stitching module 210 is preferably able to stitch the videos together before the user selects the content 302, such that the combined video is ready for playing before the content 302 is selected.

Alternatively or additionally, in some examples, the video player initiation module 212 can be used to initiate the video player on the client device before the user selects the content 302. This can help reduce or eliminate delays associated with initializing the video player, which can contribute to overall digital video latency issues. In some implementations, the video player is fully activated and ready to play the digital video before the user selects the content 302.

Figure 4:
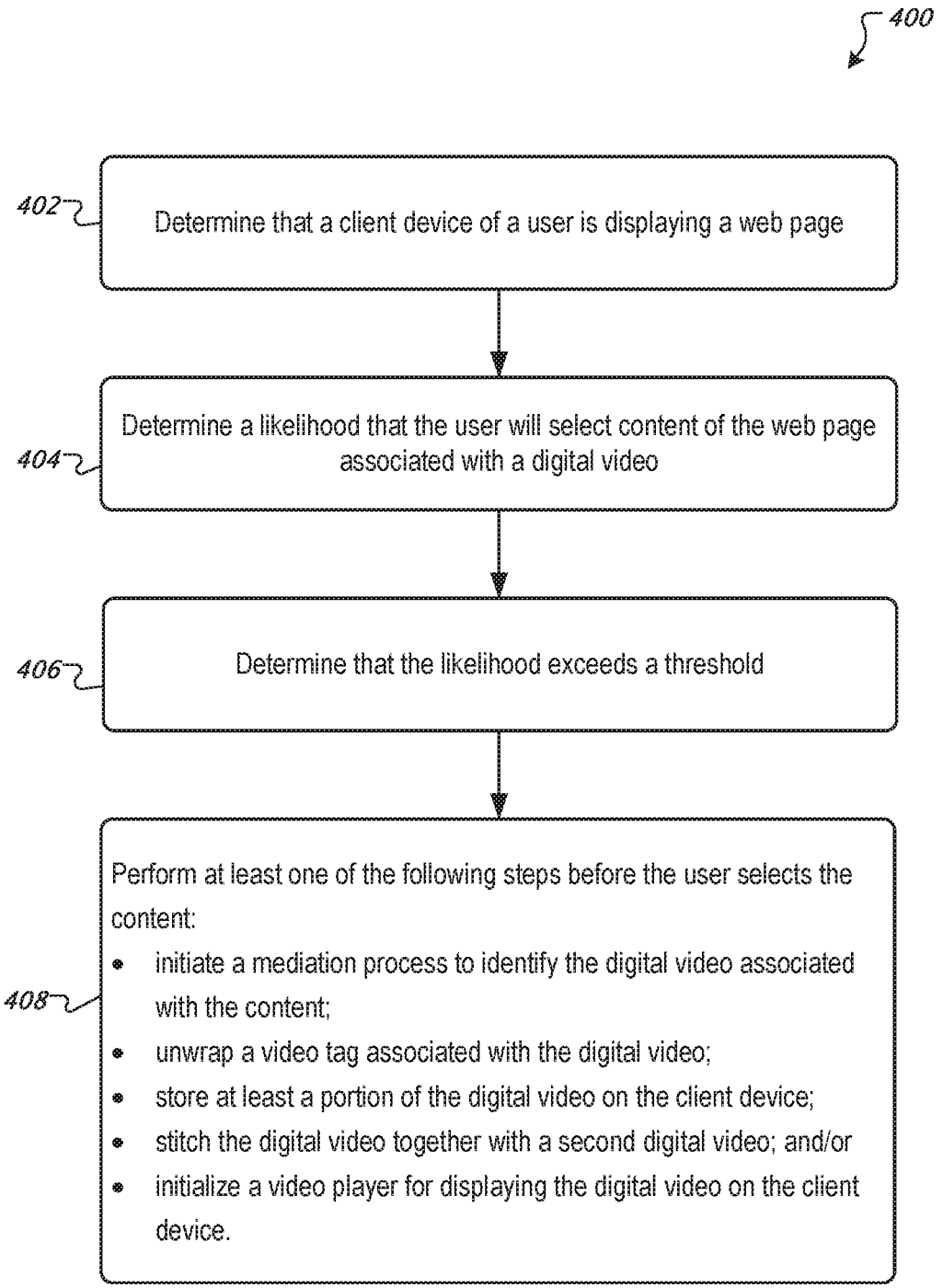
FIG. 4 is a flowchart of an example method for reducing or eliminating latency issues associated with online digital video, in accordance with some embodiments.

FIG. 4 is a flowchart of an example method 400 of reducing digital video latency. The method includes determining (step 402) that a client device of a user is displaying a web page or other digital media. A likelihood of selection (e.g., by the user) of content of the web page associated with online video is determined (step 404). Some examples of such content are described above. A determination is made (step 406) that the likelihood of selection exceeds a threshold (or that the likelihood of selection is sufficiently high) and, based thereon, at least one of the following steps is performed (step 408), before the content is selected: initiating a mediation process to identify a digital video associated with the content; unwrapping one or more video tags associated with the digital video; storing at least a portion of the digital video on the client device; stitching the digital video together with a second digital video; and initializing a video player for displaying the digital video on the client device. Advantageously, the method 400 reduces or eliminates latency issues associated with playing the digital video on the client device. In preferred examples, the digital video begins playing instantaneously or nearly instantaneously, once the content is selected.

In some embodiments, the video acceleration techniques described herein are applied to a system for online advertising. In various examples, a system for online advertising can deliver promotional messages to consumers using visual and/or audio advertisements (or "ads") in web pages. A publisher can include an ad space or other region in a web page (or other electronic document) where an advertisement can be placed. When the web page is displayed in a browser, an ad or "creative" (e.g., an image, audio, or video advertisement or other presentation) can be dynamically retrieved from an ad server for an advertiser and displayed in the ad space. The act of serving a creative on a web page can be referred to as an impression.

A publisher's ad space inventory is a collection of one or more ad spaces on web pages served by the publisher. Publishers can sell their ad space inventories to advertisers and/or can participate in auctions with advertisers in which selling and buying of ad space inventories take place. Auctions can be conducted by an ad network or ad exchange that serves as a broker between one or more publishers and a group of advertisers.

Selling and buying ad spaces can be based on pricing or payment models, such as cost per thousand impressions (CPM), cost per click (CPC), and cost per action or acquisition (CPA). In the CPM model, advertisers typically pay for every impression, and the price paid for each impression can be measured in price per 1 000 ("mille") impressions. In the CPC model, advertisers typically pay each time a viewer clicks on their advertisement. In the CPA model, advertisers typically pay for every sale, registration or other action completed as a result of viewers clicking on their advertisements.

Figure 5:
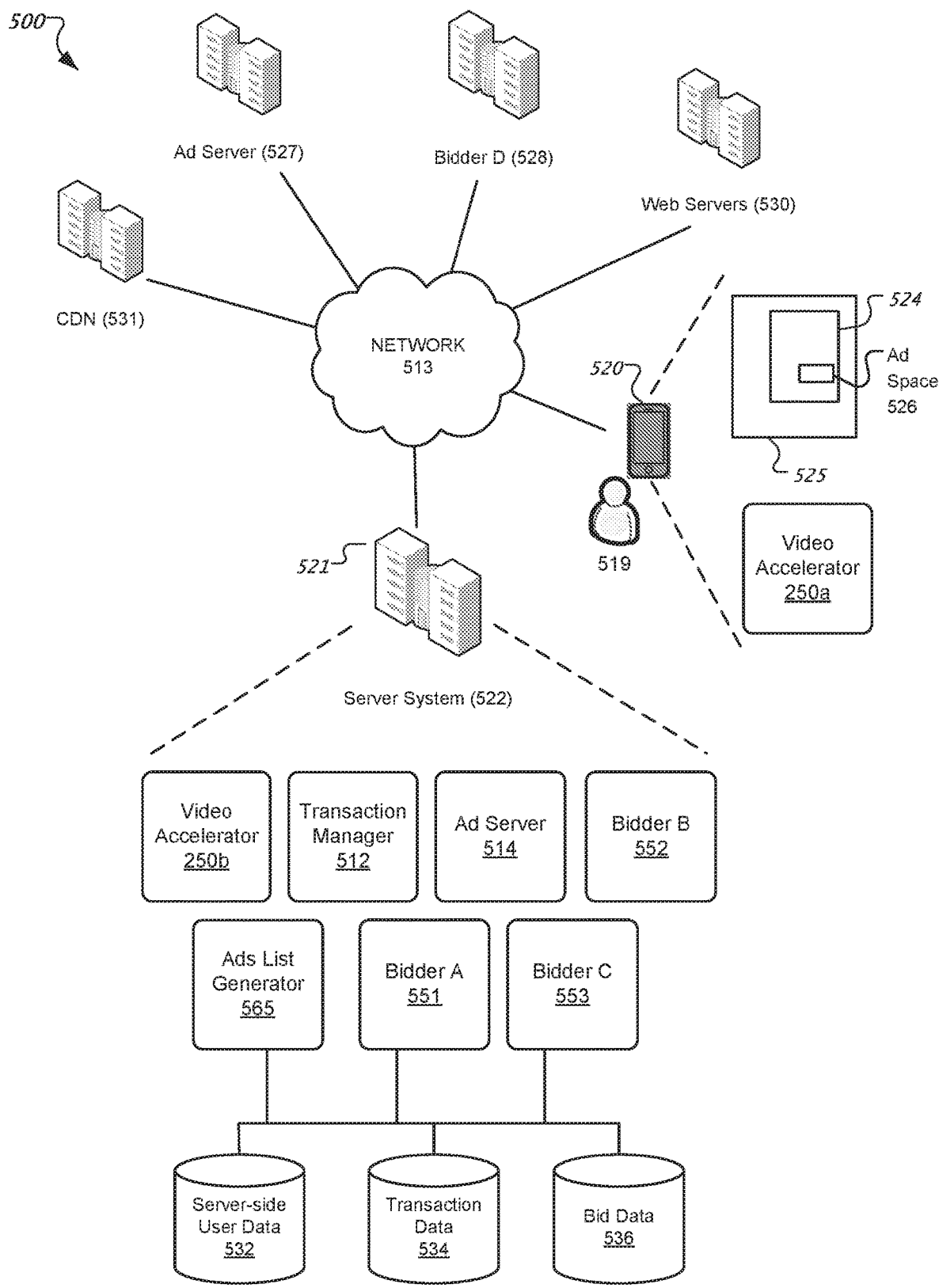
FIG. 5 is a schematic diagram of an example system including a video accelerator for reducing latency associated with online digital video, according to some embodiments.

FIG. 5 illustrates an example system 500 for online advertising, including a client-side video accelerator 250*a* and/or server-side video accelerator 250*b* for reducing latency associated with online video advertisements. A server system 522 provides functionality for real-time ad space auctions. The server system 522 includes software components and databases that can be deployed at one or more data centers 521 in one or more geographic locations, for example. The server system 522 software components may include one or more components of a video accelerator 250*b*, a transaction manager 512, an ad server 514, one or more bidders (e.g., bidder A 551, bidder B 552, and bidder C 553), and ads list generator 565. The server system 522 can also include one or more software components or tools for load balancing and/or security. The load balancing tools can manage traffic within a single data center or between multiple data centers. The security tools can manage data protection and access privilege for tenants served by the data centers 521. As described herein, the video accelerator 250 includes various modules for reducing latency associated with viewing online digital video, which are used by the system 500 to reduce latency associated with viewing online video advertisements. For example, the video accelerator 250 and its modules can be implemented in the client-side video accelerator 250*a* and/or the server-side video accelerator 250*b*. The software components can include subcomponents that can execute on the same or on different individual data processing apparatus. The server system 522 databases include a server-side user data database 532, transaction data database 534, and bid data database 536. The databases can reside in one or more physical storage systems. The software components and databases will be further described below.

The transaction manager 512 ("impression bus" or simply "Imp Bus") is an auction system that facilitates the transaction aspects of ad space inventory and impression trading between buyers and sellers. A buyer can be an advertiser (e.g., a credit card company, a sportswear company), an ad network, or an advertising agency, for example. Other buyers are possible. A seller can be a publisher (e.g., newspaper or social network), an online streaming or gaming service, or an ad network. Other sellers are possible. The transaction manager 512 processes ad requests received from web browsers or other software applications displaying content from publishers, sends relevant information to advertisers, conducts auctions (e.g., on behalf of sellers), returns creatives to the browsers or other applications, keeps track of billing and usage for advertisers and publishers, returns auction-result data, and enforces quality standards, for example. The transaction manager 512 can also coordinate the performance of various tasks to reduce or eliminate latency issues associated with online digital videos, as described herein. The transaction manager 512 stores in the transaction data database 534 various transaction information for each ad space that is transacted by the transaction manager 512 or other software components of the server system 522.

The ad server 514 is a software component that serves creatives to web pages or other applications. The ad server 514 can also make decisions about which creatives to serve, and track clicks or other user interactions with creatives, for example. A creative can be a visual or audio advertisement such as an image, an animation, a video clip, or an audio clip. Other types of a creative are possible.

A bidder system or bidder (e.g., bidder A 551) is a software component that, on behalf of a buyer, performs bidding operations. The bidder takes various pieces of bid-specific information (e.g., maximal bid price, target user areas or segments, start and end dates, budget) as input and generates a bid for a particular item of an ad space inventory, for example. A buyer can set up (e.g., through an API or web pages provided by the server system 522) a campaign targeting an ad space inventory with a set of bid-specific information for the ad space inventory and store the bid-specific information in bid data database 536. In some implementations, a bidder can be remote from the server system 522, such as bidder D 528. Here, an ad space inventory can be a collection of one or more ad spaces on web pages served by a publisher's web site. An ad space inventory can also be a collection of one or more ad spaces in user interfaces presented by a software application published by a publisher. Other types of ad space inventories are possible.

The transaction manager 512 conducts an auction when receiving an ad request for filling an available ad space. By way of illustration, a graphical user interface 524 of a software application 525 executing on client device 520 of a user 519 can include an ad space 526 and a corresponding ad tag. The application 525 can be a web browser application, or a software application such as a game application or a maps application. For instance, a web page displayed in a browser window of a web browser (e.g., running on a personal computer) can include an ad space on the web page and a corresponding ad tag. By way of illustration, the ad space can appear at the bottom of the user interface (a "banner ad") with a corresponding ad tag. Other examples of ad spaces are possible, including, without limitation, linear video ads, in-stream video ads (e.g., pre-roll, mid-roll, or post-roll in-stream video ads), interactive video ads, out-of-stream ("out-stream") video ads, overlay video ads, etc. Here, the client device 520 can be a mobile phone, a smartwatch, a tablet computer, a personal computer, a game console, or an in-car media system. Other examples of a client device are possible.

In some implementations, an ad tag includes a Uniform Resource Locator (URL) from which an ad will be requested (e.g., a URL for the server system 522), Hypertext Markup Language (HTML) statements, and/or JavaScript instructions for retrieving and displaying a creative (e.g., displaying the creative in a 160×600 iframe). The application 525 running on the client device 520 can retrieve content in the user interface 524 (e.g., a web page) through one or more data communication networks 513 such as the Internet, for example, from web servers 530 of a publisher. The ad tag causes the application 525 to send (e.g., through the networks 513) an ad request ("ad call") to the server system 522. In some implementations, the application 525 sends an ad request to the server system 522 via another advertising server system such as an ad exchange. The ad request can include information about the available ad space 526 (e.g., a size for the ad space, an identifier for the publisher), user information (e.g., an identifier of the user 519, an Internet Protocol or IP address), and system information (e.g., types of the browser and the client device), for example. The ad request can be composed in JavaScript Object Notation (JSON) or Extensible Markup Language (XML) format and transmitted to the server system 522 using Hypertext Transfer Protocol (HTTP) protocol (e.g., using HTTP POST request method). Other ad request formats and transmission methods are possible.

In response to the ad request, the transaction manager 512 can access the server-side user data store database 532 based on the user's identifier (if available), and retrieve available information about the user (e.g., user segment information such as age, gender, interests, or location). The transaction manager 512 generates a bid request including information about the ad space, the user, and so on, and sends the bid request to multiple bidders such as bidder A 551 and bidder B 552. The transaction manager 512 can also send the bid request through the networks 513 to servers of bidder D 528, which is external to the server system 522. The bid request can be composed in JSON format and sent to bidders using HTTP POST. The bid request can also be encoded or compressed. Other bid request formats and transmission methods are possible.

Each bidder can determine an appropriate bid based on its own requirements (e.g., budget, targets in placements) and, if desired, submit a bid response including a bid price and an identifier of a creative to be served, for example, to the transaction manager 512. The transaction manager 512 determines a winning bid (e.g., a highest bid) among bid responses received within a specified time period (e.g., 100 milliseconds). The transaction manager 512 then returns a creative of the winning bid to the client device 520, causing the application 525 to display the creative in the ad space in the user interface 524. The transaction manager 512 can also return a URL for a creative of the winning bid to the client device 520, causing the application 525 on the client device 520 to retrieve the creative from an ad server (e.g., ad server 514, or ad servers 527 external to the server system 522), or from servers of a content distribution network (CDN) 531. In various implementations, the transaction manager 512 can store in the transaction data database 534 transaction information such as an identifier of the creative served to the ad space, an identifier of the winning buyer, the user's identifier, the winning bid price, an identifier of the ad space, an identifier of the seller of the ad space, and a time stamp. The winning bid price (i.e., the price paid by the winning buyer) can be the bid price submitted by the winning buyer, or a second highest bid price of the auction as determined by Vickrey auction or other second-price auction mechanisms. Other types of transaction information are possible.

In comparison to display ads (e.g., ads in text, images or animations), video ads can command higher prices. However, video ads often take a long time to load into a webpage, largely because of the time required for a server (e.g., an ad network) to select a video ad and for the client device 520 to obtain the video ad and load the video ad in a video player. Particular implementations described in this disclosure describe methods for acquiring video ads and/or other online video content on the client-side. A computer program or computer-executable instructions on a client device can acquire video ads and decide on a best-available video ad to present in a web page. The programs or instructions can asynchronously acquire and cache the video ad or other video before a user views the video (e.g., before the user presses a "play" button or otherwise interacts with a video player), thus providing a better user experience. For example, a process could run asynchronously on a first web page to acquire and cache a video ad and then use the results on a second web page later (e.g., many seconds later) when the video is instantly available. Likewise, a process could run asynchronously to acquire three video ads at the commencement of a pre-roll video ad in a linear video stream and then use the results when all three ads are needed in a mid-roll ad pod.

Figure 6:
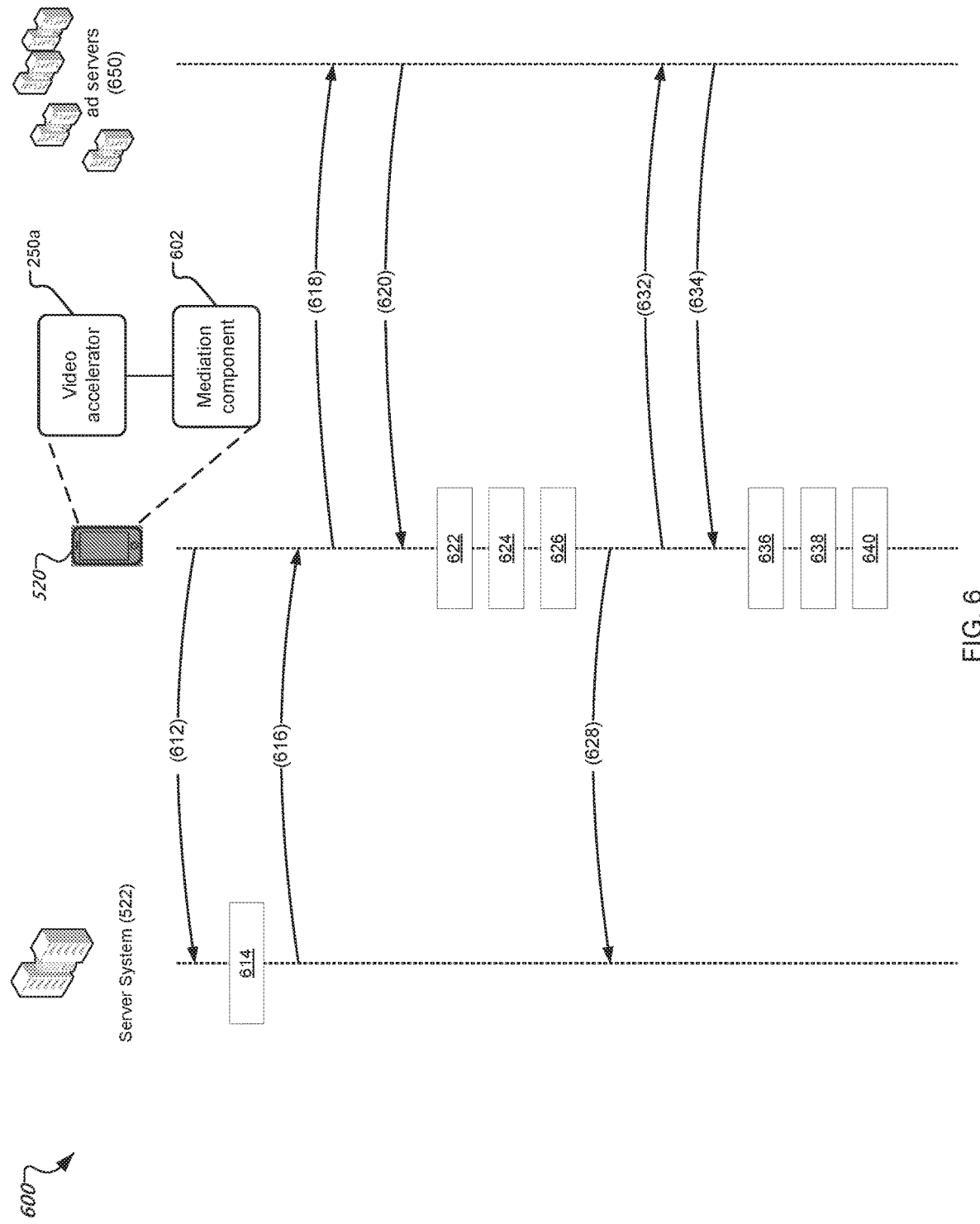
FIG. 6 is a schematic data flow diagram of an example method for using the system of FIG. 5 to reduce latency associated with online digital video, according to some embodiments.

FIG. 6 is a data flow diagram of an example method 600 for client-side video ad mediation. The method 600 can be implemented by a computer-executable mediation component 602 that executes on the client device 520, for example. The mediation component 602 can implement, for example, ad auction functionality. By way of illustration, the user interface 524 can be a web page (or a structured document), and the mediation component 602 can include JavaScript instructions in the header or body of the web page. In some implementations, the mediation component 602 can be invoked via an ad tag of an ad space (e.g., the ad space 526) in the web page, for example. In some implementations, the mediation component 602 can be invoked by the mediation initiation module 202 of the video accelerator 250a. In one example, the meditation initiation module 202 invokes the mediation component 602 upon receiving suitable instructions from the video likelihood module 200. For example, the mediation initiation module 202 may invoke the mediation component 602 upon initialization of a video ad player (e.g., in accordance with the Video Player-Ad Interface Definition (VPAID) (e.g., using VPAID Init)). Initiating client side mediation (e.g., invoking client-side video auction logic) in response to initialization of the video ad player (e.g., in the VP AID initialization block, separate from video viewing code) can avoid lengthy loading or spinning icon indicators from appearing in a blank video player. In one implementation, the mediation process is performed in advance of a user hitting the play button, for example, during loading of the web page. This allows the lengthy mediation, tag unwrapping, video caching, and/or video player initiation processes to occur in a manner not visible to a user and/or before the user selects the play button or other content. This type of logic can be used, for example, with out-stream video, where video appears on an article page between paragraphs of text, or with in-stream video. Once the video acceleration process is completed, the results can then be used, for example, within the same Flash virtual machine in a subsequent VP AID Start Ad step for a rapid video playback experience.

In FIG. 6, the mediation component 602 makes a request (step 612) to the server system 522 for an ad (e.g., a video ad) to be presented in the ad space 526. The mediation component 602 can make the request, for example, when the user 519 navigates to the user interface 524 and/or prior to user interaction with a video player. In addition to ad space information, user information, and system information described earlier, the ad request can include an indication for requesting a video ad and/or an identification of an available video player for playing video ads. A video player can be in a web browser or in an application (e.g., the user interface 524) that supports HTML or video elements, for example. Other types of video players are possible. For instance, a video player can be or include code (e.g., a "plug-in" in a web browser) that can be used to play videos.

In one implementation, after receiving the ad request, the ads list generator 565 of the server system 522 creates a ranked list of ads for the ad request (step 614). The ads list generator 565 can first identify a set of available ads (creatives). The available ads can include ads that are part of an existing agreement between a seller associated with the ad space 526 and a buyer. One or more available ads can also be from a real-time ad space auction (e.g., a real-time bidding (RTB) auction performed on RTB servers in server system 522). The ads list generator 565 can access transaction data stored in the transaction data database 534 and rank the available ads based on each ad's past performance (e.g., a number of impressions or click events over a period of time) for the ad space 526 (or for an ad space inventory including the ad space 526). Other methods for identifying and ranking available ads are possible. The ads list generator 565 can generate a ranked list of ads including top-ranked ads (e.g., the top 20 ads), for example. The ranked list can be an ordered array of ads composed in XML or another structured language, for example. Each ad in the ranked list can be specified by a web address of an ad server (or a link to another ad server) from which a creative can be retrieved. In some implementations, the list of ads is not ranked or in any particular order.

The server system 522 then sends the ranked list of ads (step 616) to the user interface 524 of the client device 520. After receiving the ranked list of ads, the mediation component 602 sends an ad request (step 618) to each of the ad servers 650 specified in the ranked list. The ad request can include information about the ad space 526, user information, and system information. The ad request can also include an indication for requesting a video ad. The ad request can also include bid information such as a minimal bid price. The ad request can be composed in JSON or XML format and transmitted to the ad servers 650 using HTTP POST protocol, for example. Note that the mediation component 602 can send the ad requests to the ad servers 650 in parallel. In some implementations, the mediation component 602 can send the ad requests to the ad servers 650 asynchronously (e.g., before the user interface 524 loads other content to be presented in the user interface 524, or before the user 519 navigates to a location near the ad space 526). In this way, an ad (e.g., a video ad) can be ready to be presented in the ad space 526 when the user 519 navigates to a location where the ad space 526 is visible (e.g., within a view port of the user interface 526). When the ad space 526 includes a video player with pre-roll, mid-roll, and/or post-roll advertising content in connection with video content desired to be viewed by the user, asynchronous ad requesting (e.g., by the mediation component 602 when invoked by the mediation initiation module 202) and video caching (e.g., by video caching module 206) can achieve a seamless transition among advertising content and desired video content by having the auction (if any) run and the advertising content downloaded prior to the user pressing "play" or prior to reaching a point in the desired video content where the advertising content will be shown (e.g., the media process for a mid-roll advertisement can be run prior to the user reaching the mid-roll). The process can run just prior to when it is needed, or well in advance of when it is needed. For greater efficiency, the process can be run close to the point in time when the video or ad is needed, in order to ensure a high probability that the user will in fact watch the ad. As described above, a video likelihood module 200 of the video accelerator 250a can be used to determine the time at which to acquire the videos or ads in advance of usage (e.g., based on a predictive model (e.g., one or more classifier algorithms), user behavior, auction running times, etc.).

After receiving the ad requests (step 618), each of the ad servers 650 can send a response (step 620) back to the mediation component 602, or can provide no response at all. A response from an ad server 650 can be a creative for a display ad. A response for a video ad can include, for example, a video creative or a "wrapper" (e.g., a Video Ad Serving Template (VAST)) that specifies a network address of another server from which a video creative can be retrieved. A response can also include pricing information associated with a creative such as a bid price (e.g., $0.05) and a payment model (e.g., CPM) that a buyer is willing to pay for the ad space 526. A response from an ad server 650 can also include an error message. Other types of response messages from the ad servers 650 are possible. A video creative can be in VPAID, Moving Picture Experts Group (e.g., MPEG or MPEG-4), Flash Video, WebM, or Ogg file format. Other file formats for a video creative are possible.

After receiving responses from the ad servers 650, the video accelerator 250a processes the responses (step 622) for presentation of a video ad in the ad space 526. More particularly, the unwrapping module 208 unwraps each wrapper response (e.g., by identifying in the wrapper response a network address of an ad server for a video creative and retrieving the video creative from the ad server, etc.). Unwrapping the wrapper responses may yield multiple redirects, which can slow down the process of obtaining a video ad and increase latency. In some embodiments, multiple wrapper responses can be unwrapped asynchronously while calling out each of the different networks in parallel to complete this process more quickly. The unwrapped contents of the wrappers (e.g., the parsed contents of the VAST tags) can be cached in local storage for quick lookup, thereby avoiding the need for slower redirects when processing the same wrappers in the future. The video accelerator 250a can stop receiving responses after a pre-determined time-out period (e.g., 500 milliseconds) if video creatives are still not yet available, such as when there is no response from a particular ad server. This can help to greatly reduce overall latency in the video ad selection process.

The mediation component 602 then selects a particular video creative from the retrieved video creatives and stores the selected video creative locally (step 624) (e.g., using the video caching module 206), such that the video is available prior to the user's need to view it. The mediation component 602 can select from the retrieved video creatives a particular one that is ranked highest in the ranked list 616. As described earlier, each response 620 can include a bid price. The mediation component 602 can select from the retrieved video creatives a particular one that has the highest bid price (e.g., the winning bid). In some implementations, the mediation component 602 selects from the retrieved video creatives one that has the highest bid price and meets a pre-determined floor price. In this way, the mediation component 602 on the client device 520 can mediate and select a video creative, without relying on a server (e.g., an ad exchange, an ad network) for selecting a video creative.

If no video creatives are available (e.g., no response from ad servers 650), the mediation component 602 can select a display ad. The mediation component 602 can also select a display ad that can be used in place of a selected video ad after the selected video ad has been presented, as will be described in more detail below. The mediation component 602 may select a display ad if the display ad is ranked highest in the ranked list, or has a highest bid price. The mediation component 602 may select a display ad (e.g., in some cases, without sending ad requests 618 for video ads), if the mediation component 602 determines that an available network bandwidth for the client device 520 is constrained, for example, below a pre-determined threshold, or with a mobile (e.g., cellular) network connection only. The mediation component 602 may also retrieve an audio portion only of a selected video creative, for example, if available bandwidth for downloading the video is constrained. In some implementations, the mediation component 602 can determine an available network bandwidth by measuring a download speed for retrieving video creatives from the ad servers 650, or additional VAST files. The mediation component 602 can also retrieve a different resolution version (e.g., different file size) of a video creative based on the determined bandwidth.

The mediation component 602 can direct the video accelerator 250a (e.g., the video caching module 206) to store (cache) the selected video creative and/or information associated with the selected ad response (e.g., VAST tag) in a local storage, for example. For instance, the video caching module 206 can store the selected video creative in one or more HTML5 local storage objects. In this way, the selected video creative can be readily available for presentation when the user 519 navigates to a location near the ad space 526 in the user interface 524 or attempts to view desired media content in a video player. The selected video can be stored in an HTML5 local storage object that does not expire, or in an HTML5 local storage object that is specific to a user session (e.g., a web browser tab) and is lost after the user session is closed. The video caching module 206 can also specify a time-to-live (e.g., 4 hours) for the local storage, and remove the cached video from the local storage after the time-to-live had expired. Other methods for storing the selected video in a local storage are possible. For instance, the video caching module 206 can store the selected video in a web browser cookie, or in a memory associated with a computing process of the video accelerator 250a ("in-memory"). The video accelerator 250a can specify a preferred list of local storages, for example, HTML5 local storage object, cookie, and in-memory. Fallback logic can be used to determine which methodology to instantiate based on a user's local environment. Note that videos can be cached as full video files (e.g., VPAID, mp4, or swf) or only as VAST tags, to reduce storage needs.

In addition, the video caching module 206 can instantiate one or more "local storage" objects for caching videos associated with the user interface 524 (or can cache videos within "session storage" associated with user sessions). For instance, each local storage object can be used for a video creative for a different advertising target (e.g., different user segments).

It should be noted that, in some implementations, certain functionality performed by the mediation component 602 as described herein can be performed by server system 522 or some other server-side component. For example, rather than executing an impression auction client-side, an ad auction platform in server system 522 can be responsible for sending the ad requests to the ad servers 650 and receiving the bid responses, if any. In other words, the ad auction techniques described above can be shifted to programmatic RTB platforms that are remote to the client device 520 but have substantially greater processing power and are optimized for such operations. In addition, such remote components (e.g., server system 522) can perform compositing or stitching of advertising content and other video content (e.g., a video clip, television program, movie, etc.), thereby delivering a single, seamless video stream to the user. For example, the video stitching module 210 of the video accelerator 250 may be implemented in the server-side video accelerator 250*b* rather than the client-side video accelerator 250*a*. The stitching approach is, in some instances, effective against ad blockers because the video stream is integrated and blocking the advertising content would result in blocking the other media content as well.

The user interface 524 can retrieve from the local storage and present (e.g., by a video player of the user interface 524) the selected video creative (step 626) in response to a user event associated with the user interface 524. For example, the user interface 524 can start presenting the selected video in the ad space 526. A user event can be a user navigating to a location near the ad space 526, a cursor hovering over the ad space 526, or a user selection of a play button or other online content. The user interface 524 can stop presenting the video creative when the user navigates away from the video creative, or when the user selects a stop or pause button, for example. Other user events for triggering the presentation and/or stoppage of the selected video are possible. For instance, the user interface 525, such as a web browser, can start presenting the selected video (e.g., in outstream video format) in a web page when a user scrolls down the web page and the selected video window appears (e.g., when at least 50% of the area or window of the selected video is in a view port of the web browser). In some implementations, the web browser turns on an audio portion of the selected video when a curser hovers over the selected video ad. The web browser can pause the selected video when the user scrolls further down (or back up) the web page and moves away from the selected video ad. The web browser can resume presenting the selected video when the user navigates back to the selected video.

After the selected video has been presented (e.g., completely, or partially but exceeding a pre-determined time period), the mediation component 602 can send a report (step 628) to the server system 522 for storing in the transaction data database 534. For instance, the report can include the winning bid price, a buyer of the winning bid, error message, a latency for retrieving the selected video creative from an ad server. Other reporting information for storing in the transaction data database 534 is possible. The mediation component 602 can instruct the video caching module 206 to remove the selected video from the local storage after the selected video has been presented.

After responses have been received (step 620), a video creative has been selected and stored in a local storage (step 624), or the selected video creative has been presented (step 626) or reported (step 628), the mediation component 602 can send a second set of ad requests (step 632) to the ad servers 650 specified in the ranked list. When receiving a second set of responses (step 634) from the ad servers 650, the mediation component 602 processes the second set of responses (step 636) for presentation of a video ad in the ad space 526, and selects and caches a second particular video creative (step 638), as described earlier in reference to steps 618, 620, 622, and 624. The second selected video creative can be cached in a local storage that is different from the local storage used for the first selected video creative. The user interface 524 can present the selected video creative (step 640) in the ad space 526 in response to a user event. More particularly, when receiving and processing the second set of responses, the mediation component 602 can have a longer time-out period for allowing the ad servers 650 to provide responses, thus providing a potentially larger pool of responses and higher bid price. The longer time-out period can be pre-determined (e.g., 600 milliseconds). The longer time-out period can also be determined based on the length of the first selected video creative. For instance, if the first selected video creative has a length of 10 seconds, the mediation component 602 can have a time-out period of 5 seconds for the second set of responses, since it is unlikely a second video creative is needed when the first selected video creative is being presented. In some implementations, the mediation components 602 can send the first set of ad requests (step 618) and the second set of ad requests (step 632) simultaneously to the ad servers 650.

As describer earlier, the mediation component 602 can be, include, or use an ad tag of an ad space. In some implementations, an ad tag can be a universal tag that supports multiple ad spaces (for ad placements) in a web page. Each ad space supports one or more ad media types. Ad media types can be a display ad, a video ad, an audio ad, and a native ad. Other ad media types are possible. For instance, an ad space can support video ads in the outstream video format. The universal tag can, in response to a user event, send ad requests for one or more of the ad spaces in the web page to the server system 522 in a single transmission (or a minimal number of transmissions). The server system 522 can conduct multiple real-time auctions (or identify existing agreements between buyers and sellers) for all requests, and provide resulting creatives (or ad servers for resulting creatives) in a single response (or in a minimal number of transmissions) to the user interface 524. The response can also include media renderers (or identifiers of renderers) for the resulting creatives.

Each ad space can include one or more targeting attributes (e.g., user demographics) and technical attributes (e.g., video skip offset, video skippability enabled, auto detection of page text width to define video layer size, and so on). The universal tag can send to the server system 522 ad request for the ad spaces in the web page, including the targeting and technical attributes. The server system 522 can conduct auctions (or identify existing agreements) for the requests based on the targeting and technical attributes.

The universal tag can support the outstream video format for ad spaces. A video ad in the outstream video format can expand from a zero initial state to full size, can pause when out of view by a configurable threshold, and/or can resume playback when in view by a configurable threshold. The outstream video format can also support audio and video behaviors (technical attributes) such as auto-play vs. mouse-over to activate sound and/or video, for example. Other audio and video behaviors supported by the outstream video format are possible.

The server system 522 can conduct auctions (or identify existing agreements) for video ads in the outstream video format as requested by the universal tag, and return resulting video ad information (e.g., in VAST tags), an outstream video renderer, and/or technical attributes for the video ad to the user interface 524.

In addition to sending ad requests to the server system 522, the universal tag or the mediation component 602 can send ad requests to the ad servers 650 for each of the ad spaces in the web page and each of the media types supported by the ad spaces. The mediation component 602 can select the best available responses from the ad servers 650, as described earlier in reference to steps 618, 620, 622, and 624. In this way, additional pools of buyers may be available (in addition to the auctions conducted by the server system 522) and can yield better revenue for the ad spaces.

In some implementations, if there is no demand for one of the media types for an ad space supported by the universal media tag, an alternative media type may be used instead. This can allow for maximizing revenue opportunity within a single ad space for the content. There could be many different media types competing for the opportunity to fill the ad space, in comparison to competing demand sources for the same media type.

In general, it is desirable to minimize the delay between a time when a user selects content on a web page and a time when a video associated with the content begins playing. Lengthy delays lead to user frustration and can cause users to abandon the content and not view the associated video. In some instances (e.g., with "outstream" video ads) a video player window can appear at and/or expand from a location on a web page as a user is viewing or scrolling down the web page. The longer the video player's window remains empty, the more impatient the user can become and/or the more likely the user is to scroll past the video player window, without viewing the video.

In various instances, latency is reduced by preparing a video player to begin playing a digital video immediately after the user selects content associated with the digital video. Initiating and/or preparing the video player to play the digital video can be performed using the video accelerator 250. For example, the video player initiation module 212 can prepare the digital video for immediate playback on the video player after the digital video has been identified (e.g., using the mediation initiation module 202) and optionally cached (e.g., using the video caching module 206) and/or stitched with another video (e.g., using the video stitching module 210).

Figure 7:
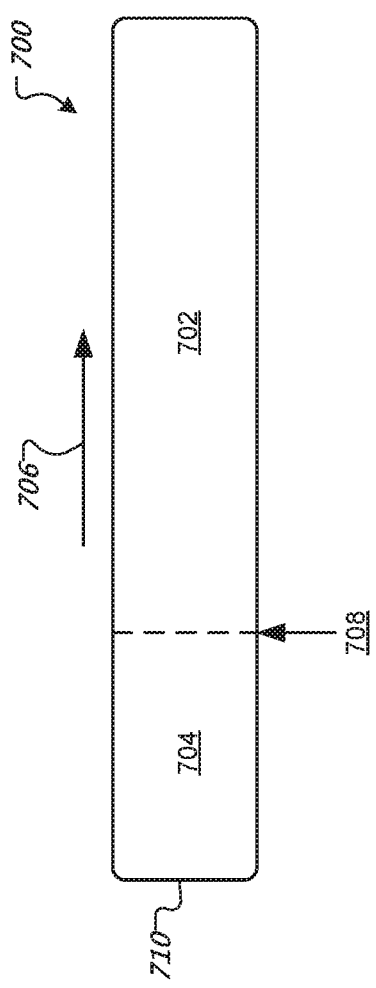
FIG. 7 is a schematic timeline diagram of a video file having an initial portion and a digital video portion, according to some embodiments.

Referring to FIG. 7, in certain examples, a video file 700 can include a digital video 702 (e.g., a digital video associated with the content 302) and an initial portion 704 (e.g., executable code and/or instructions for playing the digital video 702) that precedes the digital video 702. When a video player opens the video file 700 and proceeds through the video file 700 in a play direction 706, the video player can perform operations on the initial portion 704 before reaching or accessing the digital video 702. A start location 708 is a location where the initial portion 704 ends and the digital video 702 begins.

In preferred implementations, the video player processes the video file 700 to determine the start location 708 before the digital video 702 is displayed for the user. To determine the start location 708, for example, the video player can search for or identify a tag in the video file 700 that marks the start location 708. Alternatively or additionally, the video player can scan the video file 700 to identify a location where content in the video file 700 changes from non-video content to video content. A transition from the non-video content to the video content can indicate the start location 708. In some examples, the video player scans the video file 700 by processing or playing the video file 700 in the play direction 706, starting from a beginning 710 of the video file 700. When a tag or a change in content is encountered that indicates the start location 708, the video player can stop proceeding in the play direction 706 and/or mark the start location 708. If the video player has proceeded past the start location 708, the video player can rewind the video file 700 to the start location 708, as needed, such that the video player is ready to begin playing of the video file 700 from the start location 708. In preferred examples, the video player provides a notification to inform the video accelerator 250 or other system component(s) that the video player has been paused or stopped at the start location 708. If no such notification is received, the video player and/or the digital video 702 can be terminated. This can avoid a situation where the video player continues to play the digital video 702, possibly off-screen or in the background, without pausing or stopping at the start location 708.

With the start location 708 identified and/or with the video player positioned or configured to begin playing the video file 700 from the start location 708, the video player can now wait for further instructions (e.g., from the user). When the user selects content associated with the digital video 702, for example, the video player can begin playing the video file 700 from the start location 708. In this way, the user can avoid delays associated with initializing the video player and/or processing the initial portion 704 of the video file 700.

In some examples, when the start location 708 is identified and/or when the video player is positioned to begin playback from the start location 708, the start location 708 and/or a state of the video player can be stored. This allows the video player to close (or go to sleep) and be reopened (or woken up) when the user is ready to view the digital video 702. For example, when the user selects content associated with the digital video 702, the video player can be restarted (or woken up) and the start location 708 and/or the stored state can be retrieved, such that the video player can begin playing the video file 700 from the start location 708. Allowing the video player to close or go to sleep in this manner can free up system resources (e.g., system memory and/or a processor associated with the video player).

In various examples, a video player provides signals to other system components (e.g., the video accelerator 250) to indicate when the video file 700 has been "loaded" and/or when the digital video 702 has been "started" or "completed." It is important for such signals to be issued correctly so that the video accelerator 250 and/or other system components can be kept apprised of the video player status and can take any corrective action, as needed, to reduce or avoid digital video latency issues. For example, when a video player opens and begins processing the video file 700, the video player can send a "loaded" signal indicating that the video file 700 has been opened by the video player. Alternatively or additionally, the video player can send a "started" signal indicating that the video player has reached the digital video 702 in the video file 700 and has started playing the digital video 702. In some instances, the video player can send a "completed" signal when the video player has reached an end of the digital video 702 in the video file 700. Proper issuance of such signals can avoid situations where the video accelerator 250 or other system components make decisions based on incorrect information, which can lead to further latency issues and/or accounting issues.

To ensure the video player signals are provided at appropriate times, the video player can be configured to send signals only in certain instances. For example, in preferred implementations, the video player is configured to send the started signal only after the user has selected the content and the video player has begun playing the digital video 702. Likewise, the video player is preferably configured to send the completed signal only after the user has selected the content and the video player has completed playing the digital video 702 or a specified portion thereof (e.g., 50% or 75% of the digital video 702). Such configuring of the video player may be performed by the video accelerator module 250. For example, the video player initiation module 250 may provide instructions to the video player regarding the proper issuance of video player signals.

In some examples, any improper video player signals can be intercepted before the signals are received by third parties (e.g., web site owners or video providers) or certain system components (e.g., the transaction manager 512). In that case, for example, any signals issued by the video player can be configured to pass through a filter that lets the signals pass through only when certain circumstances are met. For example, a started signal may be permitted to pass through the filter only after the user has selected the content and the video player has begun playing the digital video 702. Additionally or alternatively, a completed signal may be permitted to pass through the filtering module only after the user has selected the content and the video player has completed playing the digital video 702 or a specified portion thereof (e.g., 50% or 75% of the digital video 702). In some instances, the initial portion 704 of the video file 700 can include executable code that instructs the video player to send the started signal when the initial portion 704 is processed by the video player. The filter can be used to block the started signal or other signals issued by the video player as a result of executable code in the initial portion 704. In certain instances, the filter is implemented in the video accelerator module 250, for example, as part of the video player initiation module 212.

Proper issuance of video player signals can be important in the context of online video advertising. If the digital video 702 is or includes a video ad, for example, improper issuance of the started signal could lead certain parties (e.g., advertisers or website publishers) to conclude that a video ad was shown to users more times than it had actually been shown. Such incorrect information could constitute fraud and/or may cause advertisers to pay publishers for ads that were never shown.

Advantageously, the systems and methods described herein are configured to be used with web browsers, applications, or other programs used to display online digital video content. In the context of outstream video, the systems and methods preferably do not expand a window to display a video until the video is actually playing.

Figure 8:
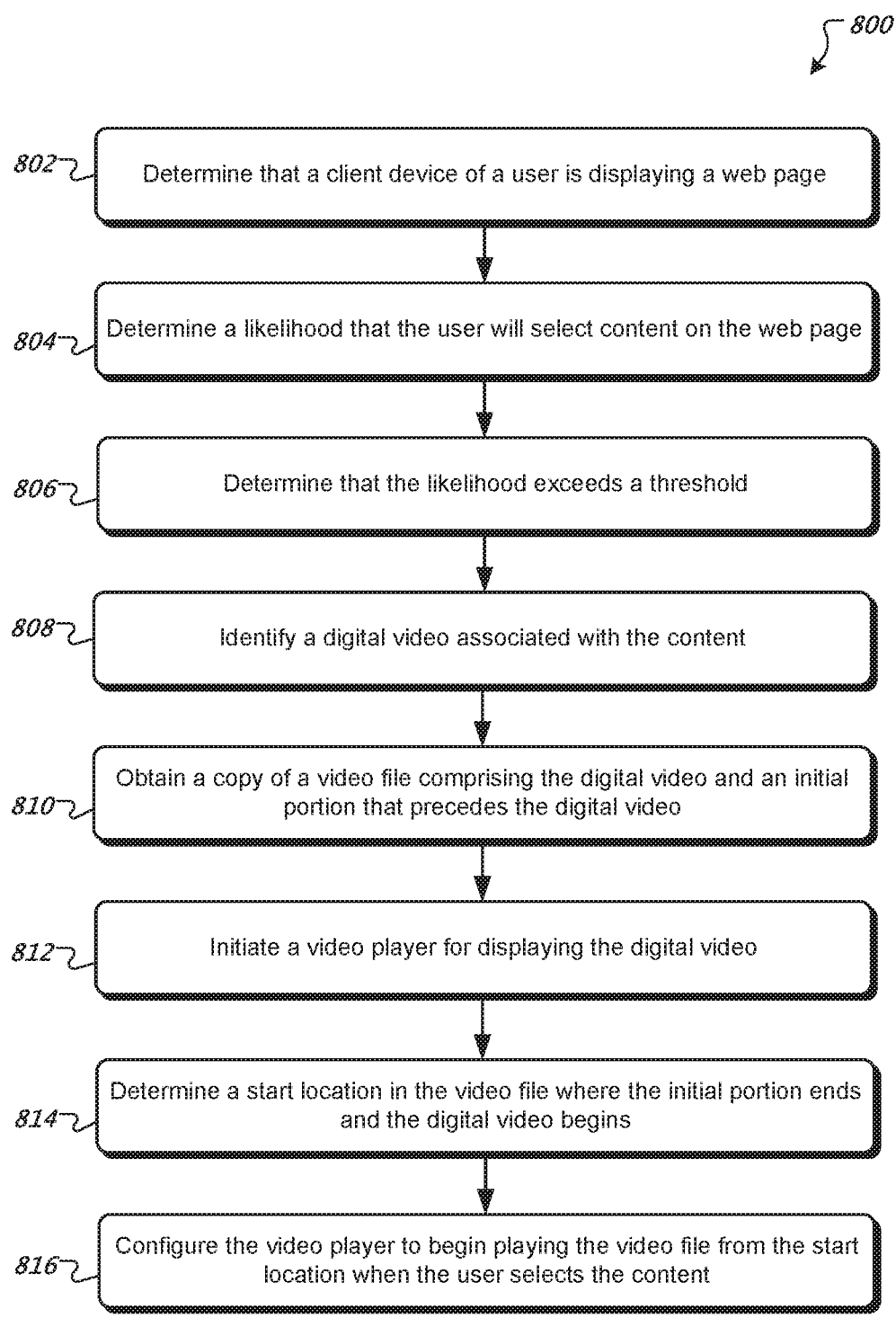
FIG. 8 is a flowchart of an example method for reducing or eliminating latency issues associated with online digital video, according to some embodiments.

FIG. 8 is a flowchart of an example method 800 of reducing digital video latency. The method includes determining (step 802) that a client device of a user is displaying a web page. A likelihood that the user will select content on the web page is determined (step 804), wherein the content is associated with a digital video. A determination is made (step 806) that the likelihood exceeds a threshold and, based thereon, the following steps are performed: the digital video associated with the content is identified (step 808); a copy of a video file is obtained (step 810) that includes the digital video and an initial portion that precedes the digital video; a video player is initiated (step 812) for displaying the digital video, a start location in the video file where the initial portion ends and the digital video begins is determined (step 814); and the video player is configured to begin playing the video file from the start location when the user selects the content.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. It should be understood that the order of steps or order for performing certain actions is immaterial so long as the systems and methods remains operable. In certain implementations, multitasking and parallel processing may be advantageous, as two or more steps or actions may be conducted simultaneously.

What is claimed is:

1. A method comprising:
   determining, by a processor of a client device, that the client device is displaying online digital content that is scrollable to enable displaying of different portions of the online digital content;
   determining, by the processor of the client device, a likelihood of activity triggering presentation of video content by a video player on the client device, wherein the determining the likelihood comprises predicting a time when the video content will be displayed in one of the different portions of the online digital content; and
   determining, by the processor of the client device, that the likelihood exceeds a threshold and, based thereon, performing the following steps before the activity triggers the presentation of the video content by the video player:
  obtaining, by the processor of the client device, a copy of the video content comprising a digital video portion and an initial portion that precedes the digital video portion;
  initiating, by the processor of the client device, the video player of the client device;
  determining, by the processor of the client device, a start location in the video content where the initial portion ends and the digital video portion begins; and
  configuring, by the processor of the client device, the video player to begin playing the video content from the start location when the activity triggers the presentation of the video content.

2. The method of claim 1, wherein the online digital content comprises a web page, and wherein the predicting the time is based on a velocity associated the scrolling and based on a distance associated with the different portions of the web page.

3. The method of claim 1, wherein the likelihood is determined based on a viewing history of a user, a viewing history of other users, or an Internet browser history.

4. The method of claim 1, wherein the activity comprises receiving a selection of a link.

5. The method of claim 1, wherein the configuring the video player comprises storing a current state of the video player.

6. The method of claim 1, wherein the determining the likelihood comprises comparing the time when the video content will be displayed with an expected duration of an Internet session.

7. The method of claim 1, further comprising storing, by processor of the client device, at least the digital video portion on the client device before the activity triggers the presentation of the video content by the video player.

8. The method of claim 1, further comprising stitching, processor of the client device, the digital video portion together with a second digital video portion before the activity triggers the presentation of the video content by the video player.

9. The method of claim 1, further comprising generating, processor of the client device, a notification that the video player has been paused at the start location.

10. A device comprising:
  a processing system including a processor;
  a display; and
  a memory that stores executable instructions that, when executed by the processing system, facilitate performance of operations, the operations comprising:
    determining that the display is displaying online digital content that is scrollable to enable displaying of different portions of the online digital content;
    determining a likelihood of activity triggering presentation of video content by a video player on the display, wherein the determining the likelihood comprises predicting a time when the video content will be displayed in one of the different portions of the online digital content; and
    determining that the likelihood exceeds a threshold and, based thereon, performing the following steps before the activity triggers the presentation of the video content by the video player:
      obtaining a copy of the video content comprising a digital video portion and an initial portion that precedes the digital video portion;
      initiating the video player of the device;
      determining a start location in the video content where the initial portion ends and the digital video portion begins; and
      configuring the video player to begin playing the video content from the start location when the activity triggers the presentation of the video content.

11. The device of claim 10, wherein the online digital content comprises a web page, and wherein the predicting the time is based on a velocity associated with scrolling and based on a distance associated with the different portions of the web page.

12. The device of claim 10, wherein the likelihood is determined based on a viewing history of a user, a viewing history of other users, or an Internet browser history.

13. The device of claim 10, wherein the activity comprises receiving a selection of a link.

14. The device of claim 10, wherein the configuring the video player comprises storing a current state of the video player.

15. The device of claim 10, wherein the determining the likelihood comprises comparing the time when the video content will be displayed with an expected duration of an Internet session.

16. The device of claim 10, the operations further comprising storing, by processor of the device, at least the digital video portion on the device before the activity triggers the presentation of the video content by the video player.

17. The device of claim 10, the operations further comprising stitching, processor of the device, the digital video portion together with a second digital video portion before the activity triggers the presentation of the video content by the video player.

18. The device of claim 10, the operations further comprising generating, processor of the device, a notification that the video player has been paused at the start location.

19. A non-transitory machine-readable medium, comprising executable instructions that, when executed by a processing system of a client device and including a processor, facilitate performance of operations, the operations comprising:
  determining that the display is displaying online digital content that is scrollable to enable displaying of different portions of the online digital content;
  determining a likelihood of activity triggering presentation of video content by a video player on the display, wherein the determining the likelihood comprises predicting a time when the video content will be displayed in one of the different portions of the online digital content; and
  determining that the likelihood exceeds a threshold and, based thereon, performing the following steps before the activity triggers the presentation of the video content by the video player:
    obtaining a copy of the video content comprising a digital video portion and an initial portion that precedes the digital video portion;
    initiating the video player of the device;
    determining a start location in the video content where the initial portion ends and the digital video portion begins; and
    configuring the video player to begin playing the video content from the start location when the activity triggers the presentation of the video content.

20. The non-transitory machine-readable medium of claim 19, wherein the online digital content comprises a web page, and wherein the predicting the time is based on a velocity associated with scrolling and based on a distance associated with the different portions of the web page.

\* \* \* \* \*